United States Patent
Roeser et al.

(10) Patent No.: US 10,478,757 B2
(45) Date of Patent: Nov. 19, 2019

(54) GROUT BRIDGE FOR FILTER UNDERDRAIN BLOCKS

(71) Applicant: Xylem Water Solutions Zelienople LLC, Zelienople, PA (US)

(72) Inventors: David E. Roeser, Wexford, PA (US); Robert J. Green, Butler, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 286 days.

(21) Appl. No.: 15/485,862

(22) Filed: Apr. 12, 2017

(65) Prior Publication Data
US 2017/0296945 A1 Oct. 19, 2017

Related U.S. Application Data

(60) Provisional application No. 62/323,124, filed on Apr. 15, 2016.

(51) Int. Cl.
*B01D 24/24* (2006.01)
*B01D 24/00* (2006.01)

(52) U.S. Cl.
CPC .......... *B01D 24/24* (2013.01); *B01D 24/001* (2013.01); *B01D 2201/34* (2013.01); *Y10T 29/49828* (2015.01); *Y10T 29/49883* (2015.01)

(58) Field of Classification Search
CPC .. B01D 24/001; B01D 24/24; B01D 2201/34; Y10T 29/49828; Y10T 29/49883
See application file for complete search history.

(56) References Cited

U.S. PATENT DOCUMENTS

| 2,818,977 | A | | 1/1958 | Crist |
| 3,615,019 | A | | 10/1971 | Early |
| 3,956,134 | A | | 5/1976 | Sturgill |
| 4,067,795 | A | * | 1/1978 | Moore .................. C10G 1/083 205/145 |
| 4,843,783 | A | * | 7/1989 | Taravella ............... E04B 1/944 52/98 |
| 5,019,259 | A | | 5/1991 | Hambley |
| 6,740,237 | B1 | | 5/2004 | Roberts et al. |
| 6,797,166 | B1 | | 9/2004 | Hambley et al. |
| 7,141,164 | B2 | | 11/2006 | Slack et al. |
| 7,820,043 | B2 | | 10/2010 | Roberts et al. |

(Continued)

FOREIGN PATENT DOCUMENTS

| DE | 3522501 A1 * | 1/1987 | ............. B01D 24/24 |
| KR | 20010068818 A | 7/2001 | |
| KR | 100950956 B1 | 4/2010 | |

*Primary Examiner* — Matthew O Savage
(74) *Attorney, Agent, or Firm* — The Webb Law Firm

(57) ABSTRACT

A filtration system includes a plurality of underdrain blocks arranged in a side-by-side configuration so as to define a gap therebetween, the gap configured to receive grout. Each underdrain block includes a top wall, a bottom wall, and a plurality of side walls connecting the top wall and the bottom wall. A grout bridge is arranged in the gap between adjacent underdrain blocks so as to form a grout seal between the grout bridge and adjacent side walls of the adjacent underdrain blocks. The adjacent sidewalls each include a rib, each rib defining a slot. The grout bridge is arranged in adjacent slots of the adjacent sidewalls of the adjacent underdrain blocks. A method of arranging a filtration system and a grout bridge are also disclosed.

15 Claims, 10 Drawing Sheets

(56) References Cited

U.S. PATENT DOCUMENTS

| | | |
|---|---|---|
| 7,997,041 B2 | 8/2011 | Slack et al. |
| 8,069,630 B2 | 12/2011 | Slack et al. |
| 8,343,343 B2 | 1/2013 | Kadakia et al. |
| 9,072,990 B2 | 7/2015 | Berkebile et al. |
| 2013/0199990 A1* | 8/2013 | Berkebile .............. B01D 24/24 210/483 |
| 2015/0343335 A1 | 12/2015 | Berkebile et al. |

* cited by examiner

US 10,478,757 B2

GROUT BRIDGE FOR FILTER UNDERDRAIN BLOCKS

CROSS REFERENCE TO RELATED APPLICATIONS

This application claims priority to U.S. Provisional Patent Application Ser. No. 62/323,124 filed Apr. 15, 2016 which is hereby incorporated by reference in its entirety.

BACKGROUND OF THE INVENTION

Field of the Invention

The present invention is directed to a filtration system including a grout bridge to provide a grout seal between adjacent underdrain blocks, as well as the grout bridge and a method of arranging a filtration system including the grout bridge.

Description of Related Art

Typical gravity or pressure filters use some type of filter media that captures the dirt particles from a liquid being filtered as the liquid passes through the media to an underdrain or collection system. Generally, beneath the filter media are underdrain laterals made up of underdrain blocks. The underdrain blocks provide a filter bottom by arranging a number of underdrain blocks together on a filter floor in a filter bed to provide an upper surface for supporting the filter media. The filter bottom upper surface is provided with openings to allow the flow of filtered liquid from the filter media to pass into the filter bottom where chambers defined by the underdrain blocks carry the filtered liquid from the filter. The chambers also serve to provide backwashing fluids (liquid or gas) for cleaning.

An example of an underdrain block is shown and described in U.S. Pat. No. 9,072,990, which is hereby incorporated by reference in its entirety. Rows of underdrain blocks (underdrain laterals) may be arranged side-by-side in a parallel formation along the filter floor of the filter bed. Grout may be used to secure the underdrain blocks in their position in the filtration system.

A filtration system may include a flume located next to or beneath the underdrain blocks. To prevent the grout used to secure the underdrain blocks from leaking into the flume, a grout bridge may be used. Previous designs of grout bridges were unsecure and allowed for exorbitant amounts of bowing and flexing, and this bowing and flexing permitted grout to leak therethrough and into the flume. Further, previous designs of grout bridges used excessive amounts of raw materials, leading to a prohibitively expensive solution that still leaks as flume width increases.

Therefore, there is a need in the art for a filtration system that includes a grout bridge that prevents leaking of grout therethrough when installed in the filtration system that is both cost efficient and effectively prevents leakage, regardless of the flume width.

SUMMARY OF THE INVENTION

The present invention is directed to a filtration system including a plurality of underdrain blocks arranged in a side-by-side configuration so as to define a gap therebetween, the gap configured to receive grout. Each underdrain block includes a top wall, a bottom wall, and a plurality of side walls connecting the top wall and the bottom wall. A grout bridge is arranged in the gap between adjacent underdrain blocks so as to form a grout seal between the grout bridge and adjacent side walls of the adjacent underdrain blocks. The adjacent sidewalls each include a rib, each rib defining a slot. The grout bridge is arranged in adjacent slots of the adjacent sidewalls of the adjacent underdrain blocks.

The present invention is also directed to a method of arranging a filtration system including arranging a plurality of underdrain blocks in a side-by-side configuration so as to define a gap therebetween, the gap configured to receive grout. Each underdrain block includes a top wall, a bottom wall, and a plurality of side walls connecting the top wall and the bottom wall. The method further includes arranging a grout bridge in the gap between adjacent underdrain blocks so as to form a grout seal between the grout bridge and adjacent side walls of the adjacent underdrain blocks. The adjacent sidewalls each include a rib, each rib defining a slot. The grout bridge is arranged in adjacent slots of the adjacent sidewalls of the adjacent underdrain blocks.

The present invention is also directed to a grout bridge for a filtration system including a first end and a second end. The first end is configured to be arranged in a sidewall of a first underdrain block and the second end is configured to be arranged in a sidewall of an adjacent second underdrain block, such that a grout seal is formed between the grout bridge and the sidewalls of the first underdrain block and the second underdrain block.

DETAILED DESCRIPTION OF THE INVENTION

Figure 1:
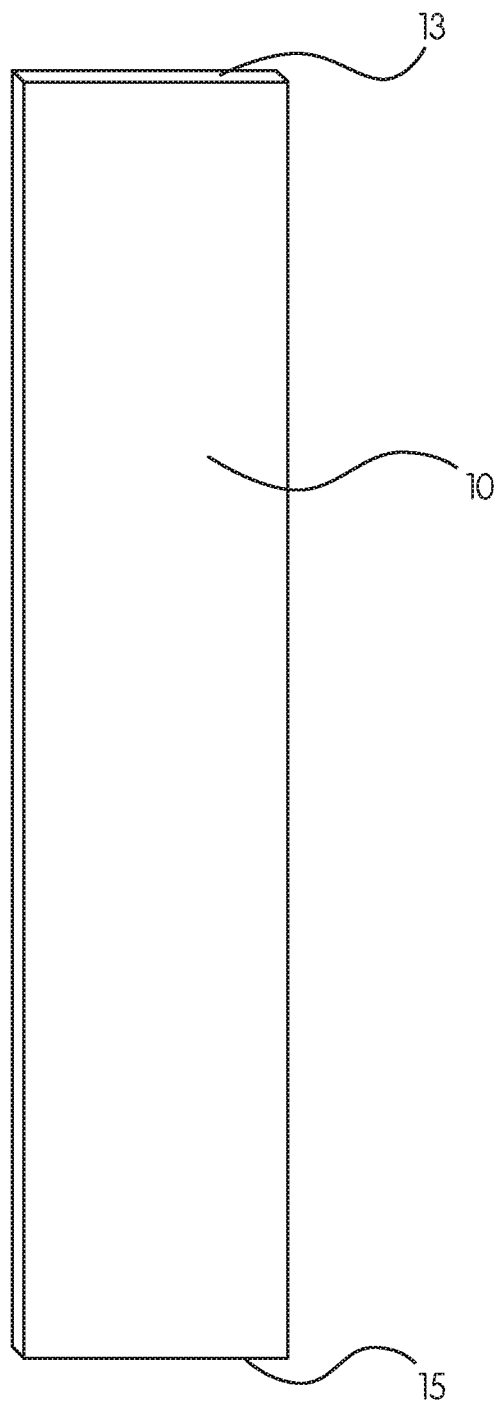
FIG. 1 is a perspective view of a grout bridge according to the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Figure 2:
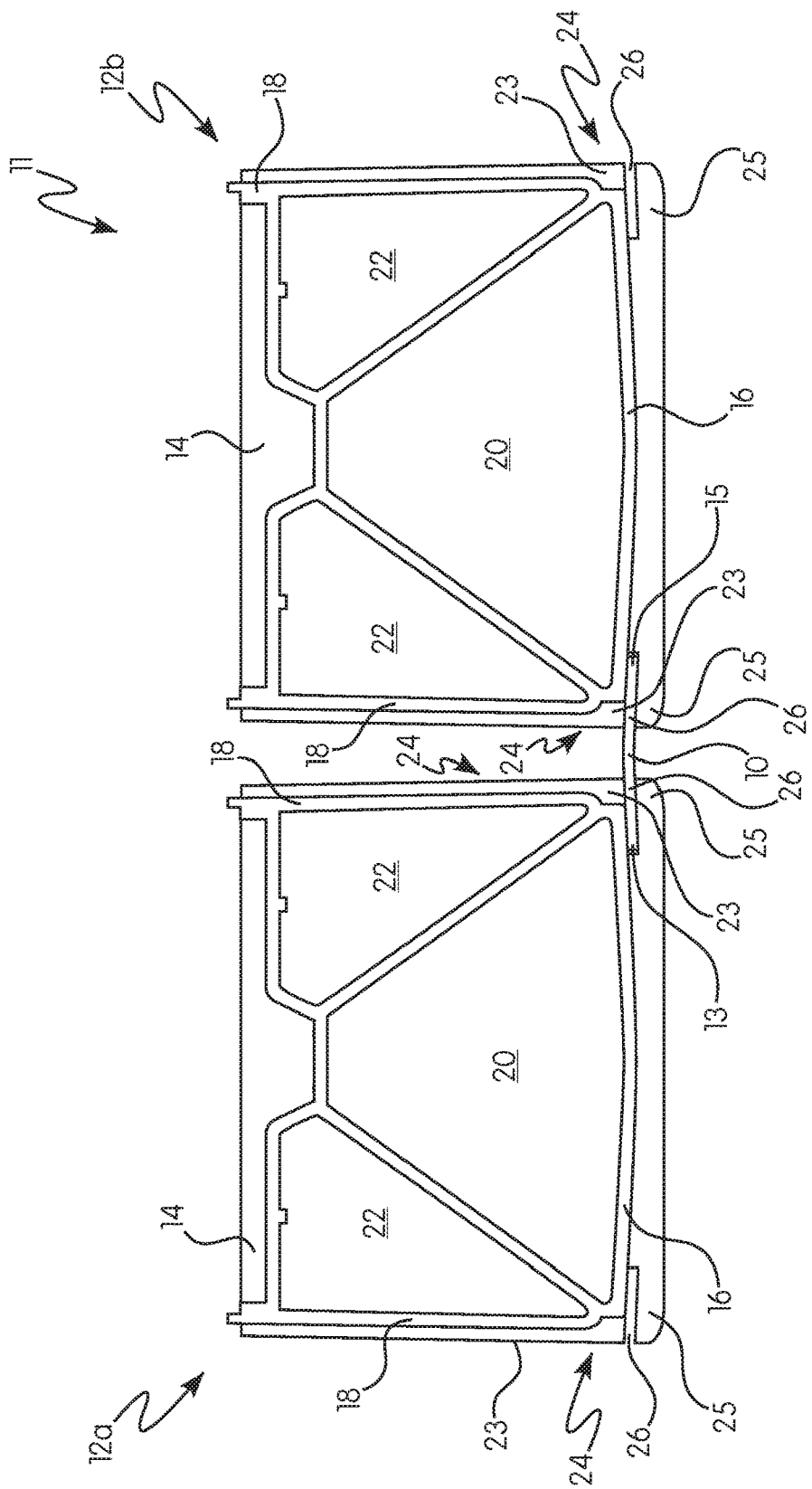
FIG. 2 is a front view of a filtration system according to the present invention having two underdrain blocks joined by a grout bridge.

Referring to FIGS. 1 and 2, a grout bridge 10 is shown which may be used in a filtration system 11 to join adjacent underdrain blocks 12a, 12b. In some non-limiting embodiments, like the one shown in FIG. 1, the grout bridge 10 may be a rectangular member of sufficient length to span between two adjacent underdrain blocks 12a, 12b installed in the filtration system 11. However, the grout bridge 10 is not limited to a rectangular member and may be of any sufficient shape and length in order to securely join two adjacent underdrain blocks 12a, 12b. In some non-limiting embodiments, the grout bridge 10 is made of plastic, such as high density polyethylene (HDPE). However, the grout bridge 10 may be made of any other suitable material.

Referring to FIG. 2, the grout bridge 10 may be used to join two adjacent underdrain blocks 12a, 12b in a filtration system 11. The filtration system 11 may be any type of filtration system 11, such as a gravity filtration system 11 using filter media to capture dirt and other particles from liquid passing through the media. An underdrain block 12a, 12b may include a top wall 14 and a bottom wall 16 connected by a plurality of side walls 18 to define at least a primary chamber 20. The underdrain blocks 12a, 12b may also include at least one secondary chamber 22, as shown in FIG. 2. The underdrain blocks 12a, 12b in FIG. 2 are shown as a rectangular block, but the underdrain blocks 12a, 12b are not limited to a rectangular block. For example, the underdrain blocks 12a, 12b may take any sufficient shape required by the design of the filtration system 11.

Referring to FIGS. 1 and 2, the grout bridge 10 may include a first end 13 and a second end 15. In some non-limiting embodiments including a first underdrain block 12a and a second underdrain block 12b, the first end 13 of the grout bridge 10 may be configured to be arranged in the sidewall 18 of a the first underdrain block 12a and the second end 15 of the grout bridge 10 may be arranged in the sidewall 18 of the second underdrain block 12b. This may create a grout seal formed between the grout bridge 10 and the sidewalls 18 of the first underdrain block 12a and the second underdrain block 12b.

The sidewalls 18 of the underdrain blocks 12a, 12b may include at least one rib 24. The ribs 24 may be a flange-like members extending from the sidewalls 18 as an integrated part of the sidewall 18 with the ribs 24 defining a slot 26. For example, as shown in FIG. 2, the ribs 24 of the underdrain blocks 12a, 12b are flange-like members extending from the sidewall 18, and the ribs 24 include an upper rib portion 23 and a lower rib portion 25. The upper rib portion 23 and the lower rib portion 25 may define the slot 26 therebetween, as shown in FIG. 2.

Figure 3:
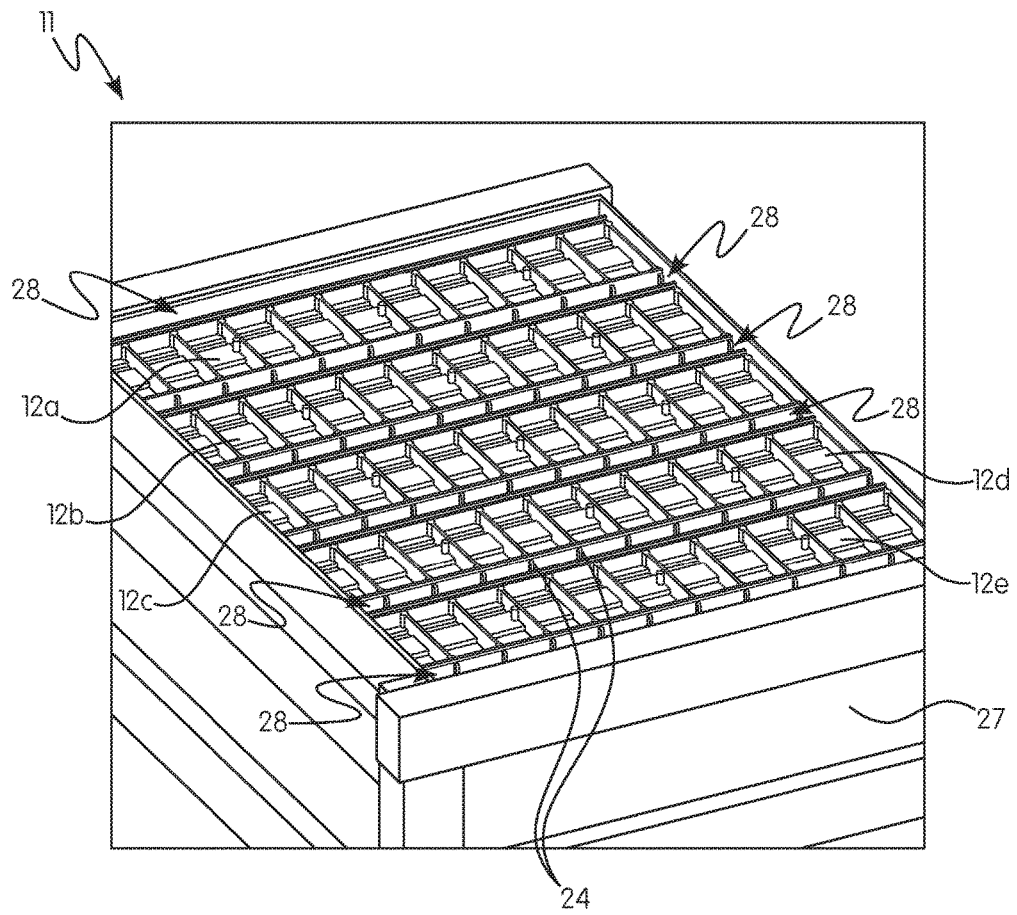
FIG. 3 is a perspective view of a filtration system according to the present invention having underdrain blocks arranged side-by-side in a parallel configuration on a filter floor before grout is added.

Referring to FIG. 3, the sidewall 18 may include a plurality of ribs 24. Ribs 24 of the sidewall 18 may be spaced apart from one another along part of a length of the underdrain blocks 12a, 12b, such as along the entire length of the underdrain blocks 12a, 12b. The spacing of the ribs 24 may be uniform or non-uniform along the length of the underdrain blocks 12a, 12b. Spacing of the ribs 24 along the length of the underdrain blocks 12a, 12b may be such that sufficient strength is provided to the installed grout bridge 10 in the case that the grout bridge 10 supports a load, such as a load of grout. Spacing of the ribs 24 along the underdrain blocks 12a, 12b may range from one inch to several feet apart. In some non-limiting embodiments, the ribs 24 are spaced between one inch and two feet apart, such as about two inches, such as about four inches, such as about six inches, such as about eight inches, such as about ten inches, such as about twelve inches, such as about fourteen inches, such as about sixteen inches, such as about eighteen inches, such as about twenty inches, or such as about twenty-two inches.

In some non-limiting embodiments, the filtration system 11 may include a plurality of underdrain blocks 12a, 12b, and adjacent underdrain blocks 12a,b include adjacent sidewalls 18. Each of the adjacent sidewalls 18 may include a plurality of ribs 24, with each rib 24 defining at least one slot 26. The grout bridge 10 may be arranged in adjacent slots 26 of the adjacent sidewalls 18 of the adjacent underdrain blocks 12a, 12b. The grout bridge 10 may run a length of the adjacent underdrain blocks 12a, 12b, such as an entire length of the adjacent underdrain blocks 12a, 12b.

Referring back to FIG. 2, as previously discussed, the ribs 24 may define at least one slot 26. The slot 26 may be configured to receive the grout bridge 10 so that the grout bridge 10 is arranged in the slot 26. The slot 26 may be configured to receive the grout bridge 10, such that a grout seal is made between the slot 26 and the grout bridge 10. A grout seal may be defined as a tight enough barrier between adjacent sidewalls 18 and the installed grout bridge 10 such that liquid, dry particulate matter, or a mixture thereof (e.g., grout) is prevented from leaking through the interface between the grout bridge 10 and the sidewalls 18. In addition, the grout bridge 10 installed in the slot 26 may be of sufficient strength and adequately supported by the ribs 24 (which define the slots 26 into which the grout bridge 10 may be installed) to prevent or minimize deflection, bowing, and flexing of the grout bridge 10, even when supporting a full load of grout. In some non-limiting embodiments, the slot 26 may be a rectangular slot 26 configured to receive the rectangular grout bridge 10 pictured in FIG. 1.

With continued reference to FIG. 2, two adjacent undrain blocks 12a, 12b may be joined by a grout bridge 10. In some non-limiting embodiments, the underdrain blocks 12a, 12b may be arranged side-by-side in a parallel or substantially parallel configuration. The underdrain blocks 12a, 12b may be joined by inserting a grout bridge 10 in adjacent slots 26 of the adjacent underdrain blocks 12a, 12b, to connect the two adjacent underdrain blocks 12a, 12b together. In some non-limiting embodiments, multiple grout bridges 10 may be used, for instance, end-to-end, along the length of adjacent underdrain blocks 12a, 12b to join the underdrain blocks 12a, 12b. In some non-limiting embodiments, a single grout bridge 10 that runs the entire length of the underdrain blocks 12a, 12b may be used to join the adjacent underdrain blocks 12a, 12b. In some embodiments, the grout bridge 10 runs a length of the underdrain blocks 12a, 12b that is sufficient to cover a flume 29 under the underdrain blocks 12a, 12b. The underdrain blocks 12a, 12b may be installed using the grout bridge 10 to join the underdrain blocks 12*a,b* using any sufficient method. In one contemplated method, a first underdrain block 12*a* may first be arranged in the filtration system 11 and the grout bridge 10 may be slid, inserted, or otherwise installed in the slots 26 of the first underdrain block 12*a*. The second underdrain block 12*b* may then be installed in such a way that the grout bridge 10 is slid, inserted, or otherwise installed in the slots 26 of the second underdrain block 12*b*, to result in the configuration shown in FIG. 2. In another contemplated installment method, the first underdrain block 12*a* and the second underdrain block 12*b* may be arranged side-by-side in their desired position in the filter bed. The grout bridge 10 may then be slid, inserted, or otherwise installed into the slots 26 of the adjacent first and second underdrain blocks 12*a*, 12*b*. The grout bridge 10 may be installed in the slots using sealant. A sealant may be used by first applying the sealant to the slots 26 or the ends 13, 15 of the grout bridge 10 and then installing the grout bridge 10 in the slots 26. However, in some non-limiting embodiments, sealant may not be used for installing the grout bridge 10 in the slots 26.

Figure 4:
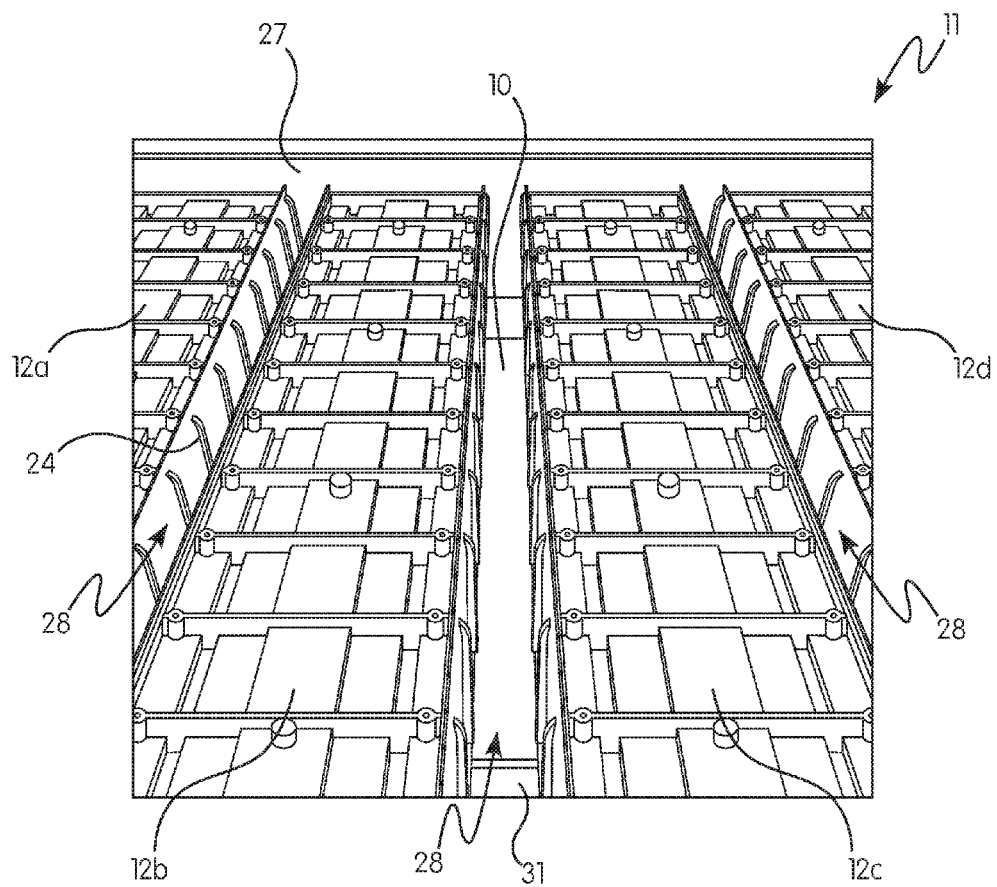
FIG. 4 is another perspective view of a filtration system according to the present invention having underdrain blocks arranged side-by-side in a parallel configuration on a filter floor before grout is added.
Figure 5:
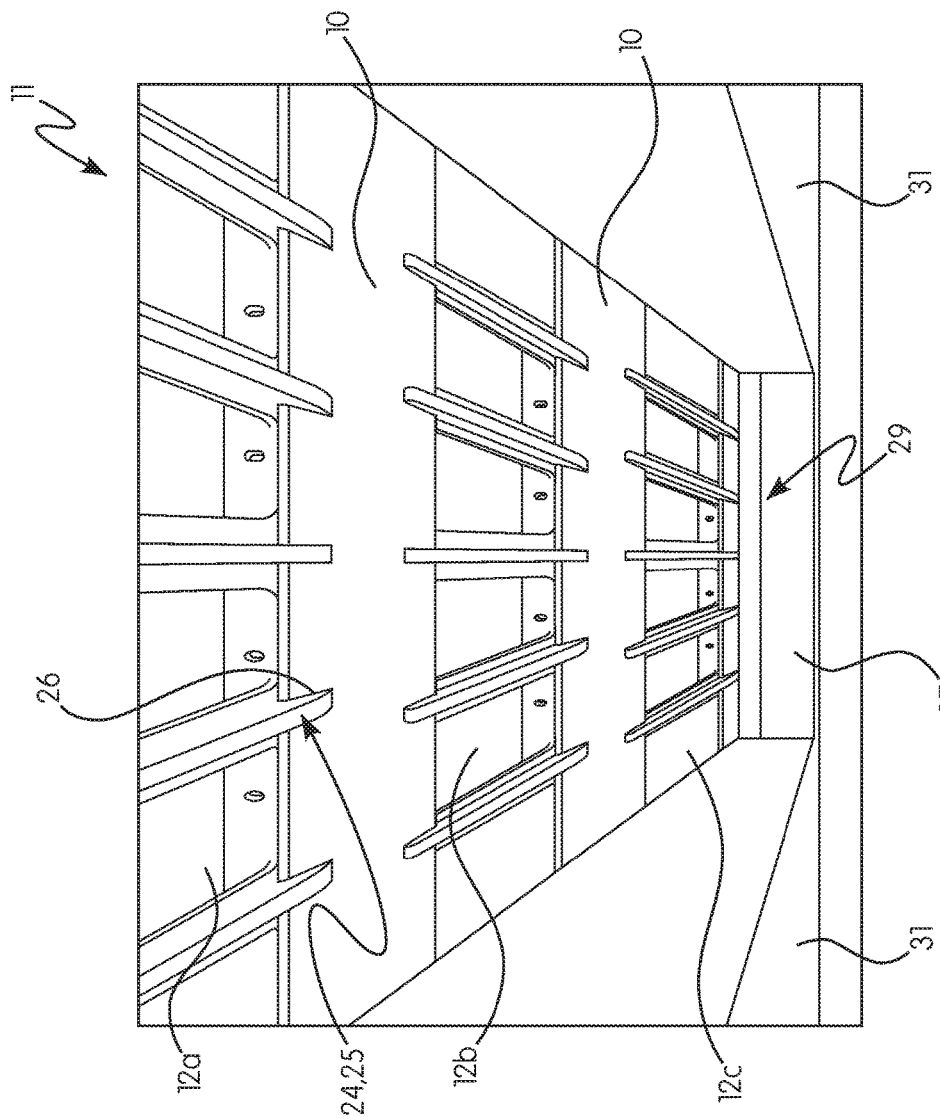
FIG. 5 is an underside view of a filtration system according to the present invention having a flume and underdrain blocks arranged side-by-side in a parallel configuration over top of the flume, the underdrain blocks joined by a grout bridge.

Referring to FIGS. 3-6, in some non-limiting embodiments, a plurality of underdrain blocks 12*a*, 12*b*, 12*c*, 12*d*, 12*e* may be arranged side-by-side in a parallel configuration in a filter bed 27 to form a filtration system 11. FIGS. 3-6 show a filter bed 27 defined by four walls. In some non-limiting embodiments, the filtration system 11 may include the filter bed 27 and a filter floor 31, upon which the underdrain blocks 12*a*, 12*b*, 12*c*, 12*d*, 12*e* may be arranged. The grout bridge 10 may be arranged substantially horizontally (parallel with the top wall 14) and positioned between the filter floor 31 and the top walls 14 of the underdrain blocks 12*a*, 12*b*, 12*c*, 12*d*, 12*e* (above the filter floor 31 and below the top walls 14). The filtration system 11 may also include the filter floor 31 over the flume 29. The flume 29 may be positioned beneath the underdrain blocks 12*a*, 12*b*, 12*c*, 12*d*, 12*e* of the filtration system 11, as shown in FIG. 5. The filtration system 11 may be large enough to fit a plurality of underdrain blocks 12*a*, 12*b*, 12*c*, 12*d*, 12*e*. In the non-limiting embodiment shown in FIG. 2, the filtration system 11 fits at least five underdrain blocks 12*a*, 12*b*, 12*c*, 12*d*, 12*e* in a side-by-side parallel arrangement.

With continued reference to FIGS. 3-4, underdrain blocks 12*a*, 12*b*, 12*c*, 12*d*, 12*e* arranged in a side-by-side parallel arrangement and placed in filtration system 11 may define gaps 28. These gaps 28 may be defined between adjacent side walls 18 of two adjacent underdrain blocks 12*a*, 12*b*, 12*c*, 12*d*, 12*e*. These gaps 28 may also be defined between the side wall 18 of the underdrain block 12*a*, 12*b*, 12*c*, 12*d*, 12*e* and an adjacent wall of the filter bed 27. For example, in FIG. 3, the five underdrain blocks 12*a*, 12*b*, 12*c*, 12*d*, 12*e* in the filter bed 27 define six gaps 28. These gaps 28 may be configured to receive liquid, dry particulate matter, or a mixture thereof (e.g., grout). As shown in FIG. 4, the grout bridge 10 may run a length of the underdrain blocks 12*a*, 12*b*, 12*c*, 12*d*. In this non-limiting embodiment, the grout bridge 10 does not run the entire length of the underdrain blocks 12*a*, 12*b*, 12*c*, 12*d* but a length sufficient to cover the flume 29 beneath the underdrain blocks 12*a*, 12*b*, 12*c*, 12*d*, but does not cover at least a part of the filter floor 31.

Figure 6:
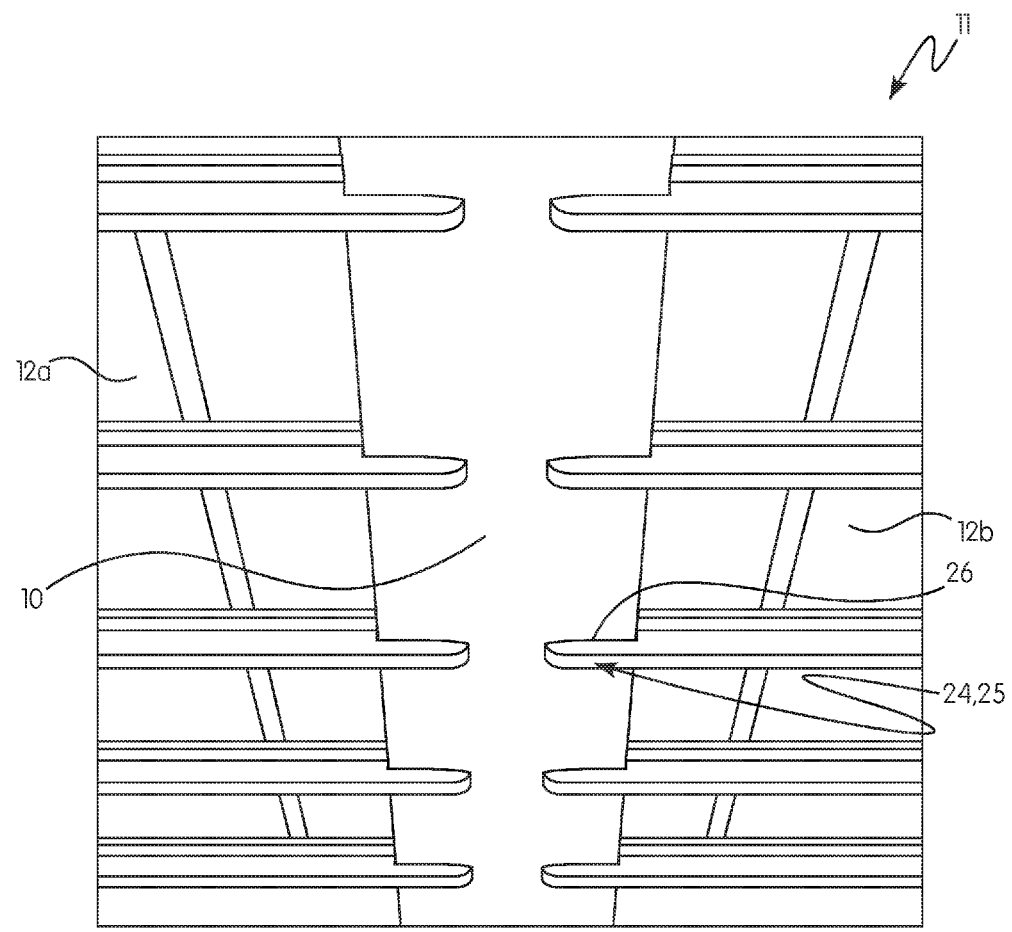
FIG. 6 is another underside view of a filtration system having underdrain blocks joined by a grout bridge.
Figure 7:
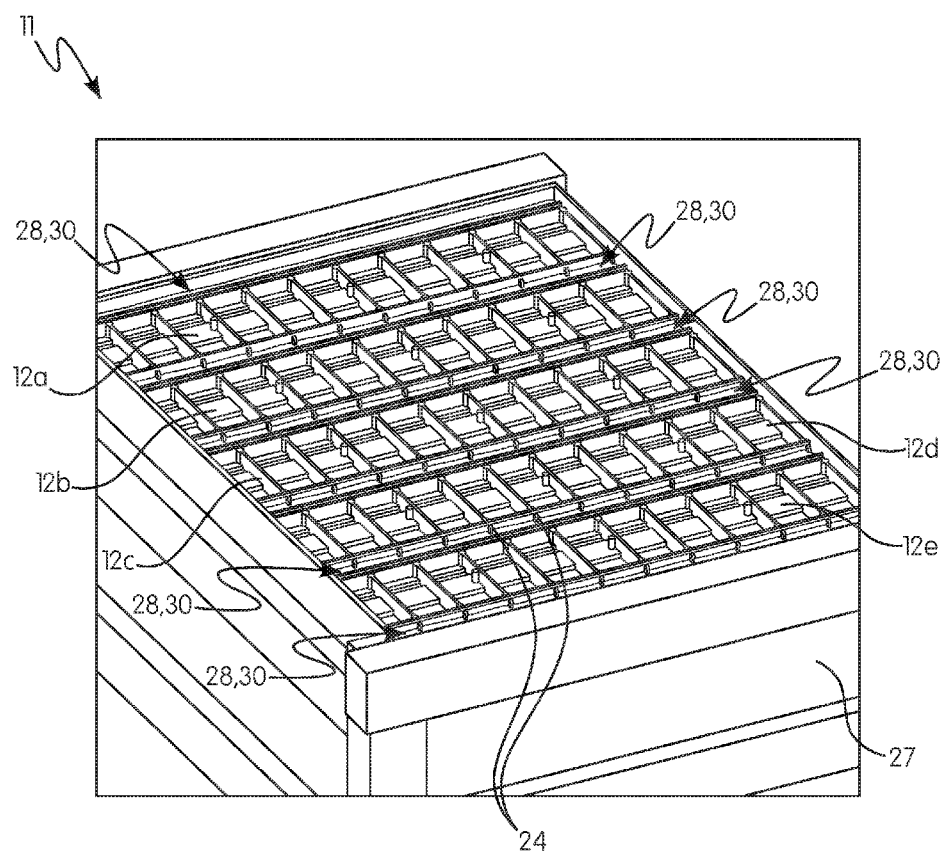
FIG. 7 is a perspective view of a filtration system according to the present invention having underdrain blocks arranged side-by-side in a parallel configuration on a filter floor after grout is added.
Figure 8:
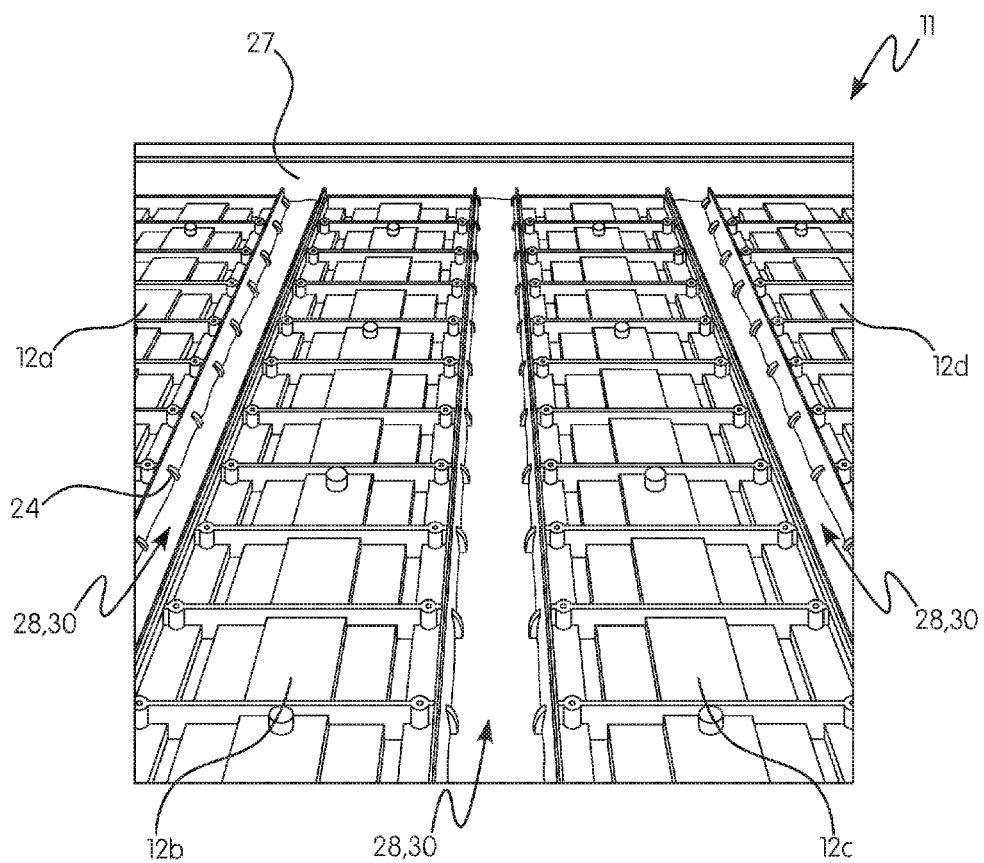
FIG. 8 is another perspective view of a filtration system according to the present invention having underdrain blocks arranged side-by-side in a parallel configuration on a filter floor after grout is added.

FIGS. 5-6 show an underside of the filtration system 11 with underdrain blocks 12*a*, 12*b*, 12*c* over top of the flume 29 in a filter floor 31. As shown in FIGS. 5-6, the ribs 24 may extend from the sidewalls 18 and define slots 26 proximate a bottom of the underdrain blocks 12*a*, 12*b*, 12*c* so that the grout bridge 10, when installed, is arranged proximate the bottom of the underdrain blocks 12*a*, 12*b*, 12*c* (e.g., proximate the bottom wall 16). The slots may be defined in a bottom half of the underdrain blocks 12*a*, 12*b*, 12*c*, such as the bottom one-third, such as the bottom one-quarter, such as the bottom one-fifth, or such as the bottom one-tenth, so that the grout bridge 10, when installed, is arranged proximate the bottom half of the underdrain blocks 12*a*, 12*b*, 12*c*, such as the bottom one-third, such as the bottom one-quarter, such as the bottom one-fifth, or such as the bottom one-tenth. The grout bridge 10 may be installed in each of the slots 26 of the adjacent sidewalls 18 of the adjacent underdrain blocks 18, as shown in FIGS. 5 and 6. As previously discussed, the sidewalls 18 may include ribs 24 spaced apart along part or the entire length of the underdrain blocks 12*a*, 12*b*, 12*c*. These ribs 24 may be spaced several inches to a couple feet apart. The grout bridge 10 that is installed in the slots 26 may be supported by these spaced ribs 24 defining the slots 26.

Referring to FIGS. 7-10, in some non-limiting embodiments, a plurality of underdrain blocks 12*a*, 12*b*, 12*c*, 12*d*, 12*e* are arranged side-by-side in a parallel configuration in a filtration system 11 filled with grout 30. The grout 30 may be any type of grout 30, such as wet mono pour grout 30. The grout 30 may refer to a flowable material that includes a mixture of a liquid, such as water, and a dry particulate material, such as cement. The cement may be standard brand Portland cement conforming to ASTM C150, Type II. In some non-limiting embodiments, the grout 30 is mixed with other materials including, but not limited to, sand.

After the underdrain blocks 12*a,b,c,d,e* are arranged in the filtration system 11, grout 30 may be added to the filtration system 11 to further secure the position of the underdrain blocks 12*a*, 12*b*, 12*c*, 12*d*, 12*e*. This grout 30 may be added after the grout bridge 10 is arranged in the gap 28 and installed to join the underdrain blocks 12*a*, 12*b*, 12*c*, 12*d*, 12*e* so as to form the grout seal between the grout bridge 10 and the adjacent slots 26 of the adjacent sidewalls 18 of the adjacent underdrain blocks 12*a*, 12*b*, 12*c*, 12*d*, 12*e*. The grout 30 may be added to the gaps 28 defined by the side-by-side parallel arrangement (or any other arrangement) of the underdrain blocks 12*a*, 12*b*, 12*c*, 12*d*, 12*e* and create the grout seal between the grout bridge 10 and the side walls 18. The grout 30 may be added to the filtration system 11 and fill the gaps 28 until the grout 30 reaches near the top of the underdrain blocks 12*a*, 12*b*, 12*c*, 12*d*, 12*e*, such as leaving less than one inch to one foot between the top of the grout 30 and the top walls 14 of the underdrain blocks 12*a*, 12*b*, 12*c*, 12*d*, 12*e*, such as about 0.25 inches, such as about 0.5 inches, such as about one inch, such as about two inches, such as about four inches, such as about six inches, such as about eight inches, or such as about ten inches. In another non-limiting embodiment, the grout 30 may be added to the filtration system 11 until the level of the grout 30 is even with the top walls 14 of the underdrain blocks 12*a*, 12*b*, 12*c*, 12*d*, 12*e*.

Figure 9:
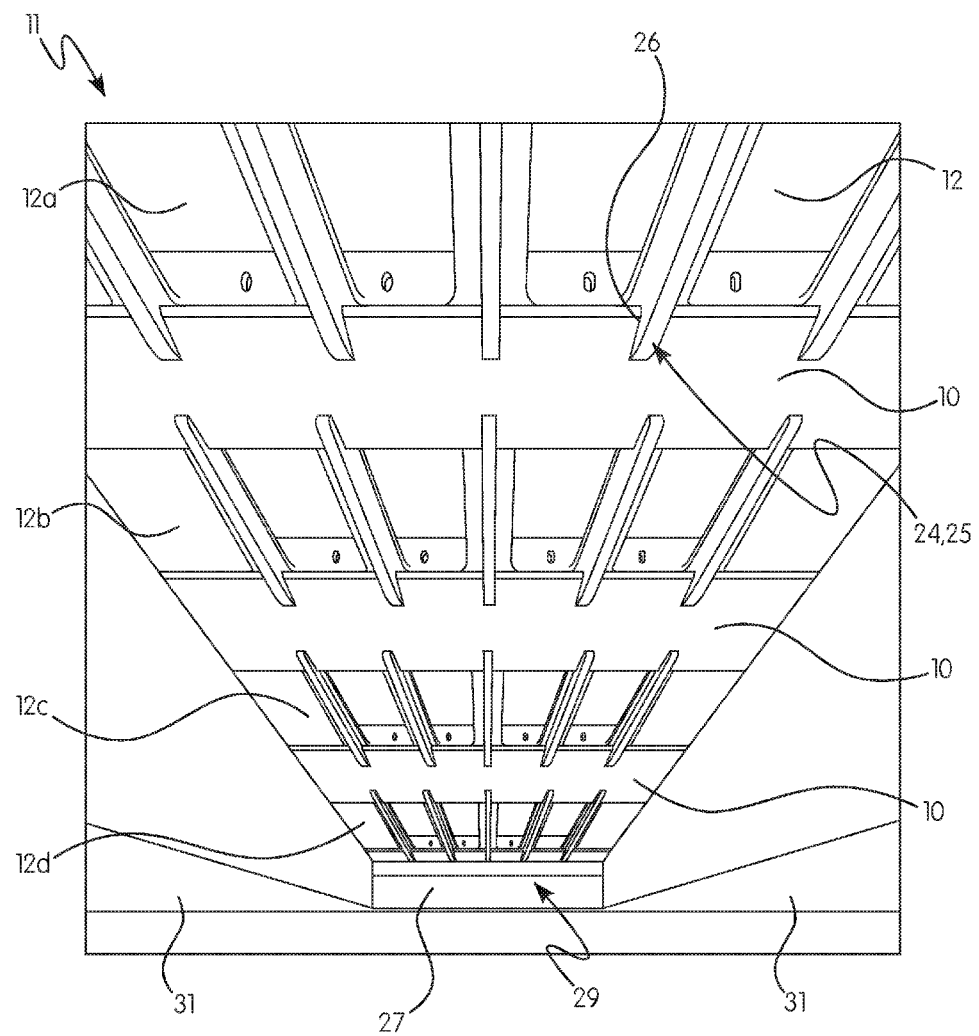
FIG. 9 is an underside view of a filtration system after grout has been added thereto according to the present invention having a flume and underdrain blocks arranged side-by-side in a parallel configuration over top of the flume, the underdrain blocks joined by a grout bridge.
Figure 10:
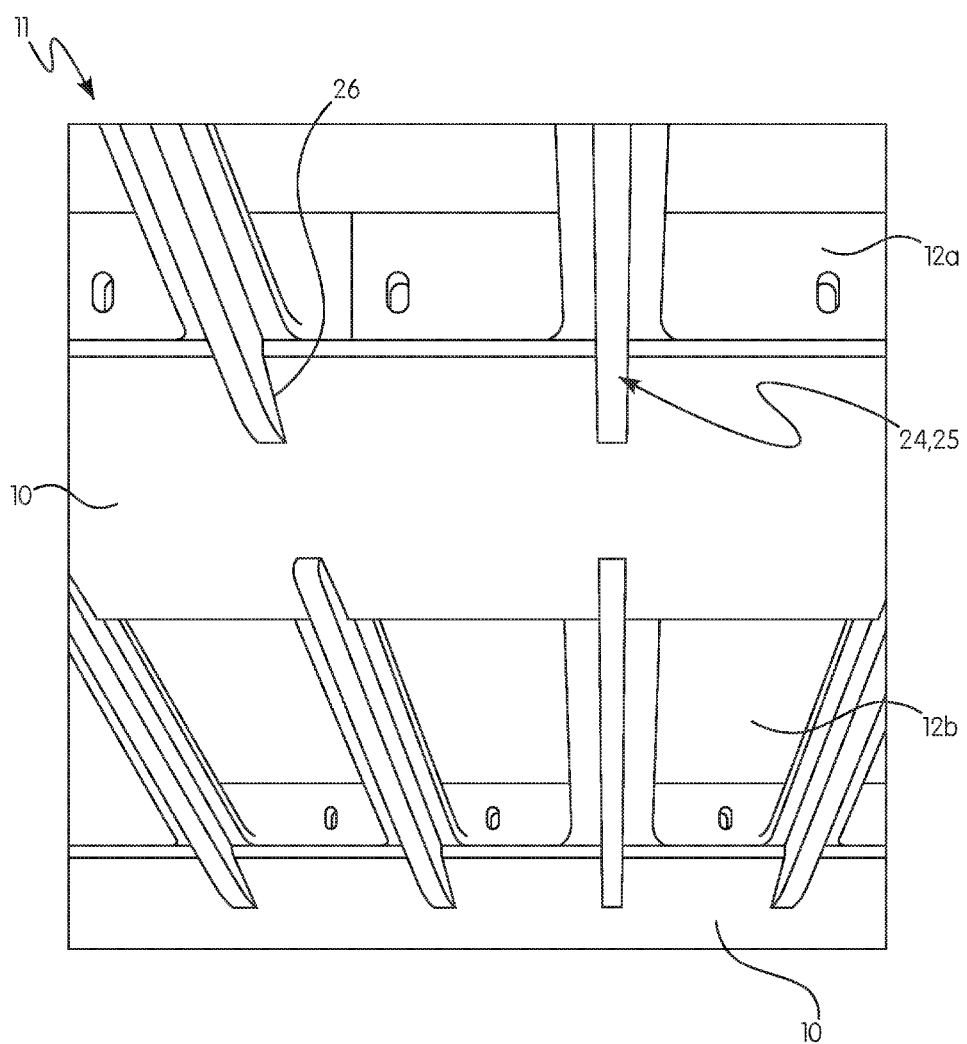
FIG. 10 is another underside view of a filtration system after grout has been added thereto having underdrain blocks joined by a grout bridge.

FIGS. 9-10 show an underside of the filtration system 11 having a flume 29, showing the underdrain blocks 12*a*, 12*b*, 12*c*, 12*d* arranged in a side-by-side parallel configuration over the flume 29, and with grout 30 added to the filtration system 11 after the grout bridges 10 have been installed to join the underdrain blocks 12*a*, 12*b*, 12*c*, 12*d* and create the grout seal between the grout bridge 10 and the sidewalls 18. As can be seen in FIGS. 9-10, no grout leakage or bridge deflection is seen, even after the grout 30 is added to the filtration system 11. Thus, in some non-limiting embodiments, the grout bridge 10 installed in the slot 26 may be configured and installed so as to prevent grout 30 from leaking therethrough, with or without the use of sealant to install the grout bridge 10 in the slots 26. In other words, the grout bridge 10 installed in the slots 26 may provide a grout seal to provide a tight enough seal between the sidewalls 18 of the underdrain blocks 12a, 12b, 12c, 12d so as to prevent grout 30 from penetrating through the interface between the grout bridge 10 and the adjacent sidewalls 18 so that the grout 30 poured into the gap 28 does not reach the flume 29 located beneath the adjacent underdrain blocks 12a, 12b, 12c, 12d. In addition, grout bridge 10 installed in the slot 26 may be of sufficient strength and adequately supported by the ribs 24 (defining slots 26 into which the grout bridge 10 may be installed) to prevent or minimize grout bridge 10 deflection, bowing, and flexing, even when supporting the full load of grout 30.

The filtration system 11 as described above may be arranged by a method that includes arranging a plurality of underdrain blocks 12a, 12b, 12c, 12d, 12e (described above) in a side-by-side configuration so as to define a gap 28 therebetween. The gap 28 may be configured to receive grout 30. The grout bridge 10 may be arranged in the gap 28 between the adjacent underdrain blocks 12a, 12b, 12c, 12d, 12e so as to form the grout seal between the grout bridge 10 and the adjacent side walls 18 of the adjacent underdrain blocks 12a, 12b, 12c, 12d, 12e. The adjacent sidewalls 18 may each include the rib defining the slot 26. The grout bridge 10 may be arranged in the adjacent slots 26 of the adjacent sidewalls 26 of the adjacent underdrain blocks 12a, 12b, 12c, 12d, 12e. Grout 30 may be poured into the gap 28.

In some non-limiting embodiments of the method, the plurality of underdrain blocks 12a, 12b, 12c, 12d, 12e includes at least a first underdrain block 12a and an adjacent second underdrain block 12b. However, any number of underdrain blocks 12a, 12b, 12c, 12d, 12e may be included. The first underdrain block 12a may be arranged. The first end 13 of the grout bridge 10 may be arranged in the slot 26 in the rib 24 of the sidewall 18 of the first underdrain block 12. The second underdrain block 12b may be arranged such that the second end 15 of the grout bridge 10 is arranged in the slot 26 of the rib 24 of the sidewall 18 of the second underdrain block 12b.

In another non-limiting embodiment of the method, the plurality of underdrain blocks 12a, 12b, 12c, 12d, 12e includes at least a first underdrain block 12a and a second underdrain block 12b. The first underdrain block 12a may be arranged side-by-side with the second underdrain block 12b. The grout bridge 10 may then be arranged in the adjacent slots 26 of the adjacent ribs 24 of the adjacent sidewalls 18 of the first underdrain block 12a and the second underdrain block 12b such that the first end 13 of the grout bridge 10 is arranged in the slot 26 of the first underdrain block 12a and the second end 15 of the grout bridge 10 is arranged in the slot 26 of the second underdrain block 12b.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A filtration system comprising:
a plurality of underdrain blocks arranged in a side-by-side configuration so as to define a gap therebetween, the gap configured to receive grout, each underdrain block comprising a top wall, a bottom wall, and a plurality of side walls connecting the top wall and the bottom wall; and
a grout bridge arranged in the gap between adjacent underdrain blocks so as to form a grout seal between the grout bridge and adjacent side walls of the adjacent underdrain blocks,
wherein the adjacent sidewalls each comprise a rib, each rib defining a slot,
wherein the grout bridge is arranged in adjacent slots of the adjacent sidewalls of the adjacent underdrain blocks.

2. The filtration system of claim 1, wherein the adjacent sidewalls of the adjacent underdrain blocks each comprises a plurality of ribs, each rib defining a slot, wherein the grout bridge is arranged in the adjacent slots of the adjacent sidewalls of the adjacent underdrain blocks, wherein the grout bridge runs a length of the adjacent underdrain blocks.

3. The filtration system of claim 1, further comprising a filter floor over a flume, wherein the plurality of underdrain blocks sit on the filter floor, and the grout bridge is arranged substantially horizontally and positioned between the filter floor and the top walls of the underdrain blocks.

4. The filtration system of claim 3, wherein the grout seal is sufficiently tight that grout poured into the gap does not reach the flume.

5. The filtration system of claim 1, wherein the grout seal is sufficiently tight that grout poured into the gap does penetrate between the grout bridge and the adjacent side walls of the adjacent underdrain blocks.

6. The filtration system of claim 1, wherein the slots are defined proximate the bottom wall of underdrain blocks, such that the grout bridge is arranged proximate the bottom wall of the underdrain blocks.

7. A method of arranging a filtration system comprising:
arranging a plurality of underdrain blocks in a side-by-side configuration so as to define a gap therebetween, the gap configured to receive grout, each underdrain block comprising a top wall, a bottom wall, and a plurality of side walls connecting the top wall and the bottom wall; and
arranging a grout bridge in the gap between adjacent underdrain blocks so as to form a grout seal between the grout bridge and adjacent side walls of the adjacent underdrain blocks,
wherein the adjacent sidewalls each comprise a rib, each rib defining a slot,
wherein the grout bridge is arranged in adjacent slots of the adjacent sidewalls of the adjacent underdrain blocks.

8. The method of claim 7, wherein the plurality of underdrain blocks comprise a first underdrain block and a second underdrain block, wherein the method further comprises:
arranging the first underdrain block;
arranging a first end of the grout bridge in a slot in a rib of a sidewall of the first underdrain block;
arranging the second underdrain block such that a second end of the grout bridge is arranged in a slot in a rib of a sidewall of the second underdrain block.

9. The method of claim 7, wherein the plurality of underdrain blocks comprises a first underdrain block and a second underdrain block, wherein the method further comprises:
arranging the first underdrain block and the second underdrain block side-by-side;

arranging the grout bridge in adjacent slots in adjacent ribs in adjacent sidewalls of the first underdrain block and the second underdrain block such that a first end of the grout bridge is arranged in the slot of the first underdrain block and a second end of the grout bridge is arranged in the slot of the second underdrain block.

10. The method of claim 7, further comprising pouring grout into the gap.

11. The method of claim 7, wherein the adjacent sidewalls of the adjacent underdrain blocks each comprises a plurality of ribs, each rib defining a slot, wherein the grout bridge is arranged in the adjacent slots of the adjacent sidewalls of the adjacent underdrain blocks, wherein the grout bridge runs a length of the adjacent underdrain blocks.

12. The method of claim 7, wherein the filtration system comprises a filter floor over a flume,
wherein the plurality of underdrain blocks sit on the filter floor, and the grout bridge is arranged substantially horizontally and positioned between the filter floor and the top walls of the underdrain blocks.

13. The method of claim 12, wherein the grout seal is sufficiently tight that grout poured into the gap does not reach the flume.

14. The method of claim 7, wherein the grout seal is sufficiently tight that grout poured into the gap does penetrate between the grout bridge and the adjacent side walls of the adjacent underdrain blocks.

15. The method of claim 7, wherein the slots are defined proximate the bottom wall of the underdrain blocks such that the grout bridge is arranged proximate the bottom wall of the underdrain blocks.

* * * * *